(12) United States Patent
Li

(10) Patent No.: US 12,494,300 B1
(45) Date of Patent: Dec. 9, 2025

(54) HIGH-TEMPERATURE CORROSION-RESISTANT STRANDED CONDUCTORS AND METHODS FOR MANUFACTURING THE SAME

(71) Applicant: HUZHOU JIN TAI CONDUCTOR TECHNOLOGY CO., LTD., Zhejiang (CN)

(72) Inventor: Xuebin Li, Huzhou (CN)

(73) Assignee: HUZHOU JIN TAI CONDUCTOR TECHNOLOGY CO., LTD., Huzhou (CN)

( * ) Notice: Subject to any disclaimer, the term of this patent is extended or adjusted under 35 U.S.C. 154(b) by 0 days.

(21) Appl. No.: 19/232,860

(22) Filed: Jun. 10, 2025

(30) Foreign Application Priority Data

Feb. 21, 2025 (CN) .......................... 202510192190.X

(51) Int. Cl.
*H01B 1/22* (2006.01)
*H01B 1/02* (2006.01)
(Continued)

(52) U.S. Cl.
CPC .............. *H01B 5/104* (2013.01); *H01B 1/026* (2013.01); *H01B 13/0285* (2013.01); *H01B 13/0292* (2013.01)

(58) Field of Classification Search
CPC ................................... H01B 1/22; H01B 5/08
See application file for complete search history.

(56) References Cited

U.S. PATENT DOCUMENTS

| 12,260,974 B1 | 3/2025 | Li |
| 2016/0099090 A1 | 4/2016 | Huang |

(Continued)

FOREIGN PATENT DOCUMENTS

| CN | 201345231 Y | 11/2009 |
| CN | 103337294 A | 10/2013 |

(Continued)

OTHER PUBLICATIONS

Teruyuki Takayama et al., Performance and Application of Hot Dip Copper Clad Steel Wire, Wire and Cable, 1993, 8 pages.

(Continued)

*Primary Examiner* — Chau N Nguyen
(74) *Attorney, Agent, or Firm* — PORUS IP LLC

(57) ABSTRACT

Provided are a high-temperature corrosion-resistant stranded conductor and a method for manufacturing the same, which relate to the field of high-temperature conductor technologies. The stranded conductor is formed by twisting a plurality of composite wire monofilaments, each including a highly conductive core wire made of copper or a copper alloy, and a high-temperature corrosion-resistant alloy cladding the core wire. The stranded conductor is capable of maintaining strength and transmitting a signal under a high-temperature atmospheric environment below 1000° C. for an extended period of time. By employing a plurality of twisted composite wire monofilaments with the above structure, the conductor achieves high strength retention, stable electrical conductivity, and superior oxidation/corrosion resistance when operating long-term under operating conditions of 600° C. to 1000° C. This solves the technical problem of conventional conductors failing in high-temperature environments.

8 Claims, 8 Drawing Sheets

(51) Int. Cl.
*H01B 5/08* (2006.01)
*H01B 5/10* (2006.01)
*H01B 13/02* (2006.01)

(56) References Cited

U.S. PATENT DOCUMENTS

| | | | |
|---|---|---|---|
| 2017/0342525 | A1 | 11/2017 | Takasawa et al. |
| 2024/0084423 | A1* | 3/2024 | Heinze .................... C22C 30/00 |
| 2025/0066896 | A1* | 2/2025 | Hattendorf ................ C22F 1/10 |

FOREIGN PATENT DOCUMENTS

| | | | |
|---|---|---|---|
| CN | 113823435 | A | 12/2021 |
| CN | 116550788 | A | 8/2023 |
| CN | 118155913 | A | 6/2024 |
| JP | H07282660 | A | 10/1995 |
| JP | 2005329504 | A | 12/2005 |

OTHER PUBLICATIONS

First Office Action in Chinese Application No. 202510192190.X mailed on Apr. 10, 2025, 12 pages.
Notification to Grant Patent Right for Invention in Chinese Application No. 202510192190.X mailed on Apr. 17, 2025, 4 pages.

\* cited by examiner

HIGH-TEMPERATURE CORROSION-RESISTANT STRANDED CONDUCTORS AND METHODS FOR MANUFACTURING THE SAME

CROSS-REFERENCE TO RELATED APPLICATIONS

This application claims priority to Chinese Patent Application No. 202510192190.X, filed on Feb. 21, 2025, the entire contents of which are hereby incorporated by reference.

TECHNICAL FIELD

The present disclosure relates to the field of high-temperature conductors, and in particular, to a high-temperature corrosion-resistant stranded conductor and a method for manufacturing the same.

BACKGROUND

Generally, a material of a conductor is prone to oxidation at a high temperature. As the temperature rises to a certain range, a strength of the conductor sharply decreases while an electrical resistance of the conductor increases. In a high-temperature environment, the conductor is typically required to exhibit a slow oxidation rate; otherwise, the conductor may corrode and fracture. In certain high-temperature atmospheric conditions, with temperatures even exceeding 1000° C., the conductor is also required to maintain an electrical conductivity. Therefore, it is essential to achieve an optimal balance among the high-temperature corrosion resistance, the electrical conductivity, and the strength of the conductor.

CN118155913B discloses a stranded conductor capable of maintaining a high strength and a high conductivity in a high-temperature environment, as well as a method for manufacturing the stranded conductor. This patent pertains to the field of high-temperature conductors. The disclosed stranded conductor is formed by twisting a plurality of composite wire monofilaments, each comprising: a nickel-tantalum-tungsten (Ni—Ta—W) core wire, a highly conductive alloy tube cladding the core wire, and a coating layer on an outer surface of the alloy tube. By twisting the composite wire monofilaments, the conductor maintains high strength, conductivity, and fatigue resistance even under prolonged operation at 600° C. to 700° C., addressing the common issues of low conductivity or insufficient strength in existing high-temperature conductor materials.

However, this technical solution is primarily suitable for high-temperature environments below 700° C., where high conductivity and strength are required. Under conditions exceeding 700° C., the conductor cannot function properly. In particular, for applications requiring continuous operation at temperatures between 800° C. and 1000° C. while maintaining good strength, signal transmission performance, and resistance to oxidation and corrosion, there are currently no suitable conductor materials available on the market.

Therefore, it is desirable to provide a high-temperature corrosion-resistant stranded conductor and a method for manufacturing the same, so as to enable the conductor to maintain high strength, electrical conductivity, signal transmission performance, and excellent oxidation and corrosion resistance during prolonged operation at high temperatures ranging from 600° C. to 1000° C.

SUMMARY

To address the issues of the existing technical solutions in this field, some embodiments of the present disclosure provide a high-temperature corrosion-resistant stranded conductor, comprising a plurality of composite wire monofilaments twisted together, each of the plurality of composite wire monofilaments being formed by a highly conductive core wire and a high-temperature corrosion-resistant alloy cladding the core wire, such that the stranded conductor is capable of maintaining strength and transmitting a signal under a high-temperature atmospheric environment below 1000° C. for an extended period of time. The highly conductive core wire is made of copper or a copper alloy. The high-temperature corrosion-resistant alloy includes, by weight: 60% to 75% nickel, 10.0% to 20.0% chromium, 5% to 15% molybdenum, 0.5% to 10% tantalum and niobium in total, 0.5% to 10% tungsten, 2.0% to 7.0% aluminum, 0.1% to 1.0% titanium, 0.1% to 2.0% iron, and a balance of unavoidable trace impurities, wherein a total content of the impurities is not greater than 0.5 wt %, and an oxygen content in the high-temperature corrosion-resistant alloy is less than 9 ppm.

One or more embodiments of the present disclosure provide a method for manufacturing a high-temperature corrosion-resistant stranded conductor, comprising: manufacturing a core wire; manufacturing a high-temperature corrosion-resistant alloy tube, including: tube forming: forming a high-temperature corrosion-resistant alloy tube billet through vacuum casting and perforation, followed by a heat treatment; ring rolling: obtaining a rolled tube by ring rolling the tube billet to reduce a diameter and a wall thickness of the tube billet and refining a grain structure of the tube billet; drawing: obtaining a drawn tube by drawing the ring-rolled corrosion-resistant alloy tube billet to further reduce the diameter of the tube billet; polishing and cleaning: polishing and cleaning an inner wall of the drawn tube billet; manufacturing a composite wire monofilament, including: tube insertion: inserting the manufactured core wire into the manufactured high-temperature corrosion-resistant alloy tube to obtain an initial composite wire; drawing: drawing the initial composite wire so that the core wire and the high-temperature corrosion-resistant alloy tube are tightly bonded; bright annealing: performing a bright annealing treatment on the drawn composite wire; sequentially repeating drawing and bright annealing until a composite wire monofilament with a desired outer diameter is obtained; heat treatment: performing an inert gas-protected heat treatment on the composite wire monofilament; manufacturing the high-temperature corrosion-resistant stranded conductor, including: stranding: stranding a plurality of composite wire monofilaments obtained in the above operations to form the high-temperature corrosion-resistant stranded conductor; heat treatment: performing an inert gas-protected heat treatment on the high-temperature corrosion-resistant stranded conductor. A high-temperature corrosion-resistant alloy of the high-temperature corrosion-resistant alloy tube includes, by weight, 60% to 75% nickel, 10.0% to 20.0% chromium, 5% to 15% molybdenum, 0.5% to 10% of tantalum and niobium in total, 0.5% to 10% tungsten, 2.0% to 7.0% aluminum, 0.1% to 1.0% titanium, 0.1% to 2.0% iron, and a balance of unavoidable trace impurities, wherein a total content of the impurities is not greater than 0.5 wt %, and an oxygen content in the high-temperature corrosion-resistant alloy is less than 9 ppm The embodiments of the present disclosure provide at least the following advantageous effects:

(1) By compositing a high-temperature corrosion-resistant alloy on the outer surface of the highly conductive core wire, the conductor can not only meet the requirements for normal signal transmission under high-temperature conditions but also operate reliably for extended periods under such conditions, thereby solving the technical problem in the prior art where conductor materials fail to perform reliably under prolonged high-temperature exposure.

(2) By manufacturing a composite-structure conductor material, it is possible to ensure that the ultrafine-dimension conductor maintains high electrical conductivity while also exhibiting high mechanical strength and corrosion resistance, thus satisfying the requirements for normal signal transmission under high-temperature conditions.

(3) The ultrafine-structure conductor material reduces space and weight requirements during use, making it particularly suitable for applications with strict spatial and weight constraints and prolonged high-temperature operating conditions.

DETAILED DESCRIPTION

Figure 1:
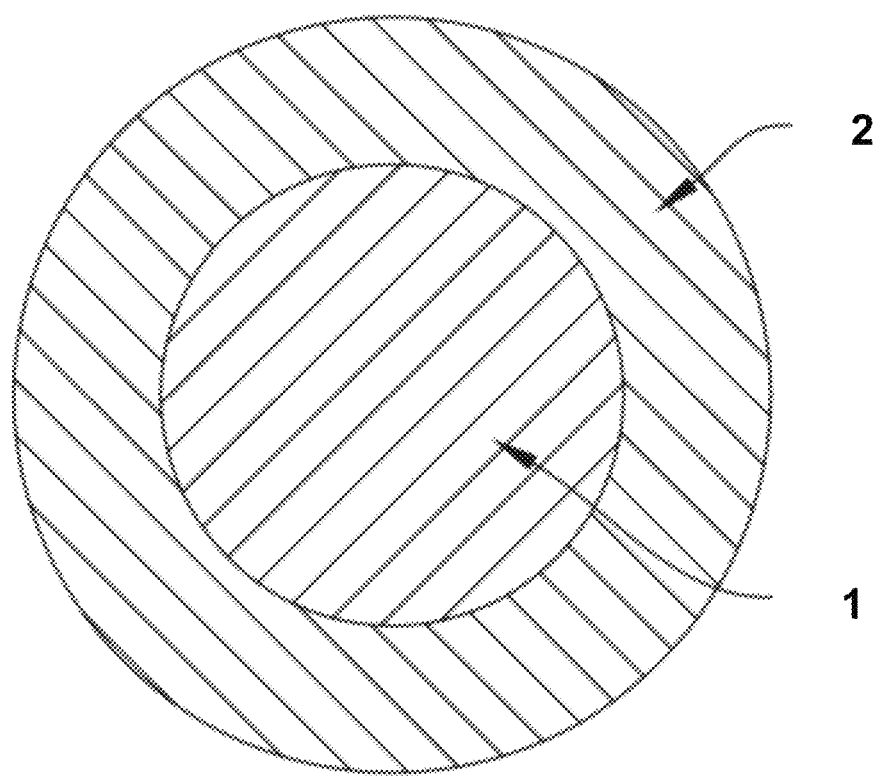
FIG. 1 is a schematic cross-sectional structural diagram of a composite wire monofilament according to some embodiments of the present disclosure.

To more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

Some embodiments of the present disclosure provide a high-temperature corrosion-resistant stranded conductor, which is formed by twisting a plurality of composite wire monofilaments.

Figure 2:
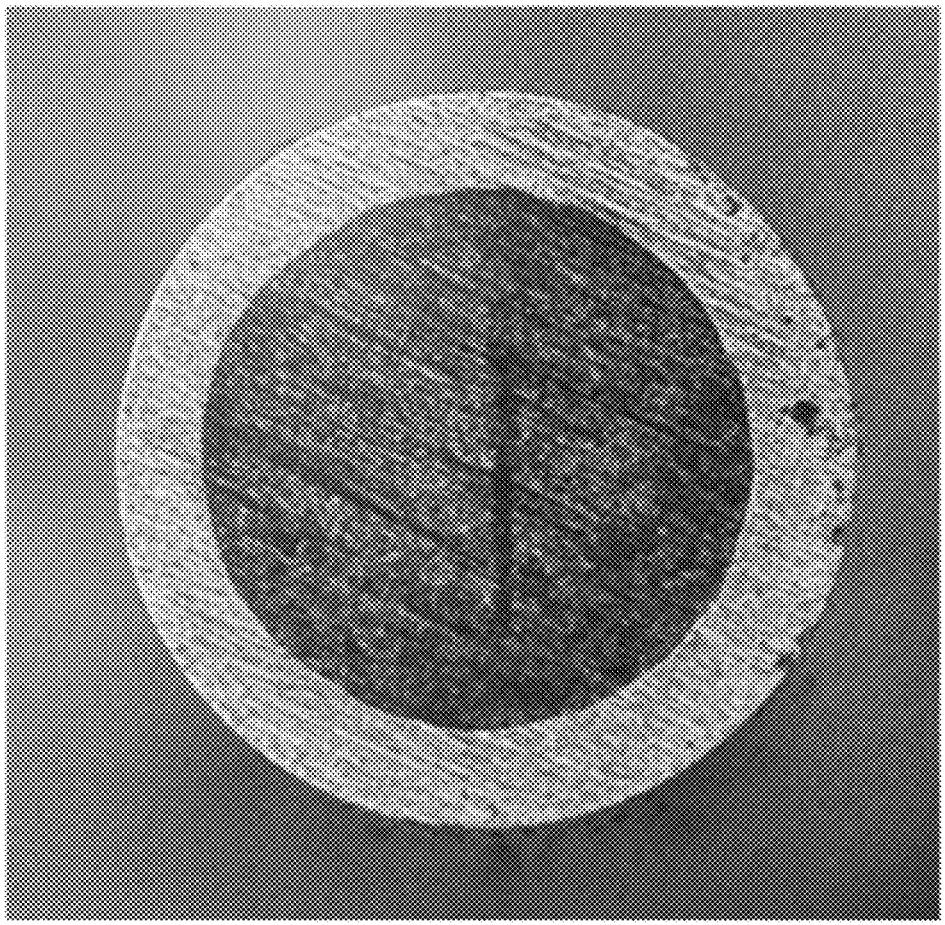
FIG. 2 is a schematic microscopic view of a cross-section of a composite wire monofilament according to some embodiments of the present disclosure.

FIG. 1 is a schematic cross-sectional structural diagram of a composite wire monofilament according to some embodiments of the present disclosure. FIG. 2 is a schematic microscopic view of a cross-section of a composite wire monofilament according to some embodiments of the present disclosure.

As shown in FIGS. 1 and 2, the composite wire monofilament is formed by a highly conductive core wire 1 and a high-temperature corrosion-resistant alloy 2 cladding the core wire 1, such that the stranded conductor is capable of maintaining strength and transmitting a signal under a high-temperature atmospheric environment below 1000° C. for an extended period of time.

In some embodiments, the highly conductive core wire 1 is made of copper or a copper alloy.

In some embodiments, a ratio of a cross-sectional area of the core wire 1 to a total cross-sectional area of the composite wire monofilament is in a range from 20% to 50%.

In some embodiments, the ratio of the cross-sectional area of the core wire 1 to the total cross-sectional area of the composite wire monofilament is one of 20%, 25%, 30%, 35%, 40%, 45%, or 50%.

It should be noted that when the ratio of the cross-sectional area of the core wire 1 to the total cross-sectional area of the composite wire monofilament is too large, high conductivity can be achieved during signal transmission in a relatively thin conductor, but long-term high-temperature corrosion resistance cannot be maintained. Conversely, if the ratio of the cross-sectional area of the core wire 1 to the total cross-sectional area of the composite wire monofilament is too small, the conductivity required for signal transmission may not be met, although the high-temperature corrosion resistance is excellent. Therefore, an appropriate ratio may be selected based on actual operating conditions.

In some embodiments, the ratio of the cross-sectional area of the core wire 1 to the total cross-sectional area of the composite wire monofilament is a range from 30% to 50%.

In some embodiments, the ratio of the cross-sectional area of the core wire 1 to the total cross-sectional area of the composite wire monofilament is one of 30%, 35%, 40%, 45%, or 50%.

In some embodiments, the high-temperature corrosion-resistant alloy 2 includes, by weight: 60% to 75% nickel, 10.0% to 20.0% chromium, 5% to 15% molybdenum, 0.5% to 10% tantalum and niobium in total, 0.5% to 10% tungsten, 2.0% to 7.0% aluminum, 0.1% to 1.0% titanium, 0.1% to 2.0% iron, and a balance of unavoidable trace impurities, wherein a total weight of the impurities is not greater than 0.5%, and an oxygen content in the high-temperature corrosion-resistant alloy 2 is less than 9 ppm.

In some embodiments, prior to stranding, under an operating condition of 20° C., a tensile strength of the composite wire monofilament is greater than 400 MPa, an electrical conductivity of the composite wire monofilament is greater than 20%, and an elongation rate of the composite wire monofilament is greater than 2%

In some embodiments, a diameter of the composite wire monofilament is in a range from 0.08 mm to 0.5 mm. In some embodiments, the diameter of the composite wire monofilament is one of 0.08 mm-0.45 mm, 0.08 mm-0.40 mm, 0.08 mm-0.35 mm, 0.08 mm-0.30 mm, 0.08 mm-0.25 mm, 0.08 mm-0.20 mm, 0.08 mm-0.15 mm, or 0.08 mm-0.10 mm.

Figure 7:
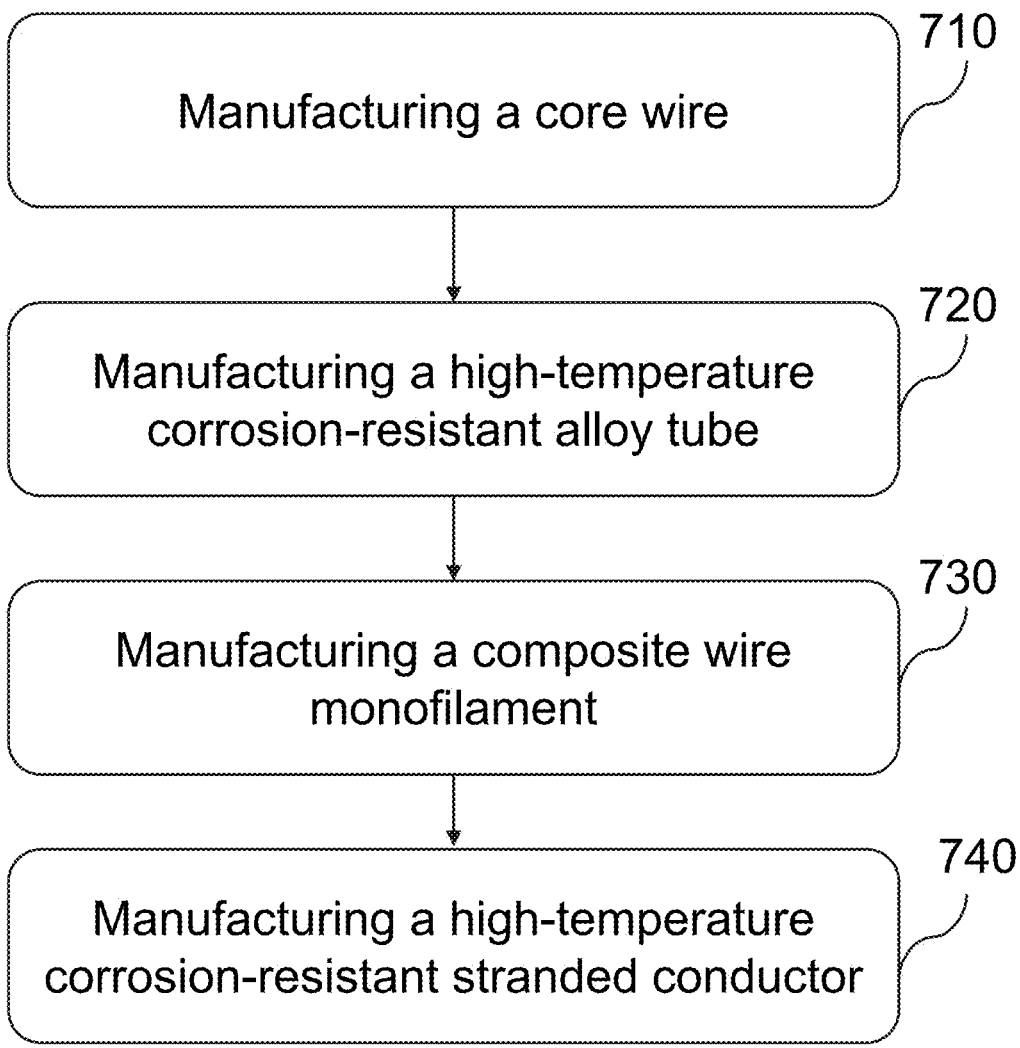
FIG. 7 is a flowchart of an exemplary process of a method for manufacturing a high-temperature corrosion-resistant stranded conductor according to some embodiments of the present disclosure.

Some embodiments of the present disclosure provide a method for manufacturing a high-temperature corrosion-resistant stranded conductor. FIG. 7 is a flowchart of an exemplary process of a method for manufacturing a high-temperature corrosion-resistant stranded conductor according to some embodiments of the present disclosure. As shown in FIG. 7, process 700 for manufacturing a high-temperature corrosion-resistant stranded conductor comprises the following steps:

In Step 710, a core wire is manufactured.

Figure 8:
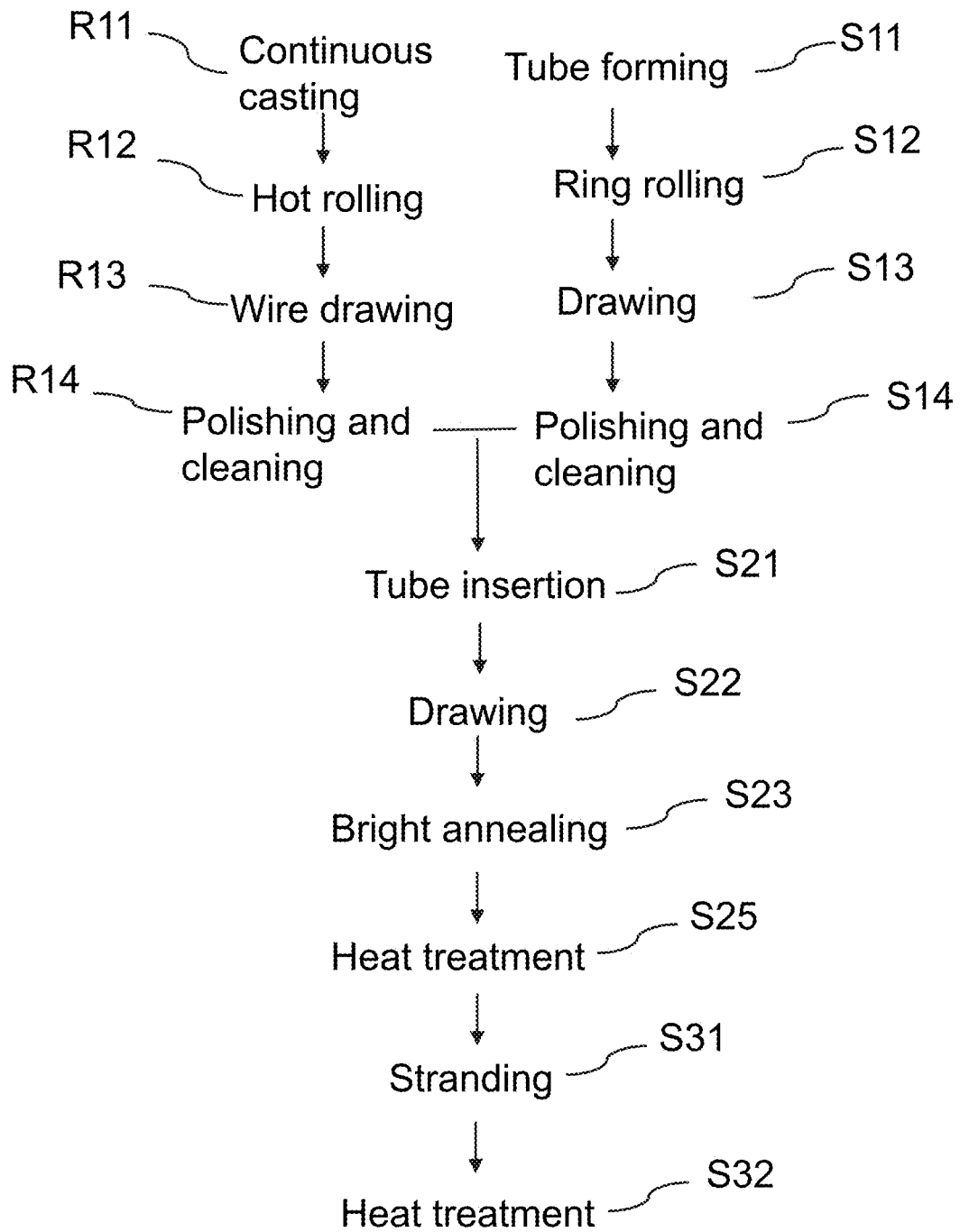
FIG. 8 is a detailed process flow diagram for manufacturing a high-temperature corrosion-resistant stranded conductor according to some embodiments of the present disclosure.

In some embodiments, as shown in FIG. 8, when the highly conductive core wire 1 is made of a copper-silver alloy, Step 710 includes the following steps R11-R14.

R11: Continuous casting: Oxygen-free melting of the copper-silver alloy is performed, followed by continuous casting to obtain a copper-silver alloy rod.

In some embodiments, a diameter of the copper-silver alloy rod is 20 mm.

R12: Hot rolling: The copper-silver alloy rod is hot-rolled to reduce the diameter of the copper-silver alloy rod to a preset diameter and then rapidly cooled to room temperature, thus obtaining a fine-grained copper-silver wire billet.

In some embodiments, a hot-rolling temperature for the hot-rolling operation ranges from 550° C. to 650° C. In some embodiments, the hot-rolling temperature may be one of 550° C., 560° C., 570° C., 580° C., 590° C., 600° C., 610° C., 620° C., 630° C., 640° C., or 650° C.

In some embodiments, the preset diameter may range from 5 mm to 10 mm. In some embodiments, the preset diameter may be one of 5 mm, 6 mm, 7 mm, 8 mm, 9 mm, or 10 mm.

R13: Wire drawing: The hot-rolled copper-silver wire billet is drawn to obtain a copper-silver alloy wire with a specified diameter.

In some embodiments, the diameter of the drawn copper-silver alloy wire may range from 4 mm to 5 mm. In some embodiments, the diameter of the drawn copper-silver alloy wire may be one of 4 mm, 4.2 mm, 4.4 mm, 4.6 mm, 4.8 mm, or 5 mm.

R14: Polishing and cleaning: The copper-silver alloy wire is polished and a surface of the copper-silver alloy wire is cleaned.

In some embodiments, as shown in FIG. 8, if the highly conductive core wire 1 is made of copper, Step 710 includes the following steps R21-R24.

R21: Continuous casting: Oxygen-free melting of copper is performed, followed by continuous casting to obtain a copper rod.

In some embodiments, a diameter of the copper rod is 20 mm.

R22: Hot rolling: The copper rod is hot-rolled to reduce its diameter and then rapidly cooled, thus obtaining a fine-grained copper rod billet.

In some embodiments, a hot-rolling temperature for the hot-rolling operation ranges from 550° C. to 650° C. In some embodiments, the hot-rolling temperature may be one of 550° C., 560° C., 570° C., 580° C., 590° C., 600° C., 610° C., 620° C., 630° C., 640° C., or 650° C.

In some embodiments, the copper rod may be hot-rolled to reduce its diameter to a preset diameter and then rapidly cooled to room temperature, thus obtaining a fine-grained copper rod billet.

In some embodiments, the preset diameter may range from 5 mm to 10 mm. In some embodiments, the preset diameter may be one of 5 mm, 6 mm, 7 mm, 8 mm, 9 mm, or 10 mm.

R23: Wire drawing: The hot-rolled copper rod billet is drawn to obtain a copper rod with a specified diameter. In some embodiments, the diameter of the drawn copper rod may range from 4 mm to 5 mm. In some embodiments, the diameter of the drawn copper rod may be one of 4 mm, 4.2 mm, 4.4 mm, 4.6 mm, 4.8 mm, or 5 mm.

R24: Polishing and cleaning: The copper rod is polished and a surface of the copper rod is cleaned.

In Step 720, a high-temperature corrosion-resistant alloy tube is manufactured.

In some embodiments, as shown in FIG. 8, Step 720 includes the following steps S11-S15:

S11: Tube forming: A high-temperature corrosion-resistant alloy tube billet is produced via vacuum casting and perforation, followed by a heat treatment.

In some embodiments, an outer diameter of the high-temperature corrosion-resistant alloy tube billet ranges from 40 mm to 80 mm, and a wall thickness of the high-temperature corrosion-resistant alloy tube billet ranges from 5 mm to 8 mm. In some embodiments, the outer diameter of the high-temperature corrosion-resistant alloy tube billet may be one of 40 mm, 45 mm, 50 mm, 55 mm, 60 mm, 65 mm, 70 mm, 75 mm, or 80 mm. In some embodiments, the wall thickness of the high-temperature corrosion-resistant alloy tube billet may be one of 5 mm, 5.5 mm, 6 mm, 6.5 mm, 7 mm, 7.5 mm, or 8 mm.

In some embodiments, a temperature for the heat treatment is 1100° C. In some embodiments, the temperature for the heat treatment may be one of 1150° C., 1200° C., 1250° C., or 1300° C.

S12: Ring rolling: A rolled tube is obtained by ring rolling the tube billet to reduce a diameter and a wall thickness of the tube billet and refining a grain structure of the tube billet.

In some embodiments, the rolled tube obtained after ring rolling has an outer diameter of 20 mm and a wall thickness of 2 mm to 3 mm.

The ring rolling process refines the grain structure of the high-temperature corrosion-resistant alloy tube billet, and improves a strength, a hardness, a fatigue resistance, a corrosion resistance, and a workability of the high-temperature corrosion-resistant alloy tube billet.

S13: Drawing: A drawn tube is obtained by drawing the ring-rolled corrosion-resistant alloy tube billet to further reduce the diameter of the tube billet.

In some embodiments, the drawn tube obtained after drawing has an outer diameter of 8 mm and a wall thickness of 1.5 mm to 2 mm.

S14: Polishing and cleaning: An inner wall of the drawn tube is polished and cleaned to obtain the high-temperature corrosion-resistant alloy tube 2.

In Step 730, a composite wire is manufactured.

In some embodiments, as shown in FIG. 8, Step 730 includes the following steps S21-S25:

S21: Tube insertion: The core wire 1 obtained in Step 710 is inserted into the high-temperature corrosion-resistant alloy tube 2 obtained in S14 to obtain an initial composite wire.

S22: Drawing: The initial composite wire obtained in S21 is drawn so that the core wire 1 and the high-temperature corrosion-resistant alloy tube 2 are tightly bonded.

In some embodiments, a total deformation rate of each drawing operation in S22 is not greater than 40%.

In some embodiments, the total deformation rate of each drawing operation in S22 may be one of 5%, 10%, 15%, 20%, 25%, 30%, or 35%.

S23: Bright annealing: A bright annealing treatment is performed on the drawn composite wire obtained in S22.

In some embodiments, an annealing temperature for the bright annealing treatment ranges from 800° C. to 900° C.

In some embodiments, the annealing temperature for the bright annealing treatment may be one of 800° C., 820° C., 840° C., 860° C., 880° C., or 900° C.

S24: Steps S22 and S23 are repeated sequentially until a composite wire monofilament with a desired outer diameter is obtained.

S25: Heat treatment: An inert gas-protected heat treatment is performed on the composite wire monofilament.

In some embodiments, the heat treatment in S25 is annealing at 900° C. for 2 hours under a protective atmosphere.

In Step 740, the high-temperature corrosion-resistant stranded conductor is manufactured.

In some embodiments, as shown in FIG. 8, Step 740 includes the following steps S31-S32:

S31: Stranding: A plurality of composite wire monofilaments obtained in Step S25 are stranded together to form the high-temperature corrosion-resistant stranded conductor.

S32: Heat treatment: An inert gas-protected heat treatment is performed on the high-temperature corrosion-resistant stranded conductor.

In some embodiments, a temperature for the heat treatment in S32 ranges from 400° C. to 500° C.

The following describes the method for manufacturing a high-temperature corrosion-resistant stranded conductor according to some embodiments of the present disclosure and the performance of the obtained conductor through four examples and three comparative examples.

Example 1

In this example, the highly conductive core wire 1 is a copper-silver alloy. In some embodiments, the copper-silver alloy includes, by weight: 1% to 6% silver, and a balance of copper and unavoidable impurities, where a total content of the impurities is not greater than 0.05%, and an oxygen content in the copper-silver alloy is less than 9 ppm. The annealed core wire 1 has a tensile strength of no less than 300 MPa and a conductivity greater than 80%.

In this example, the ratio of the cross-sectional area of the core wire 1 to the total cross-sectional area of the composite wire monofilament ranges from 30% to 50%.

In this example, the high-temperature corrosion-resistant alloy tube 2 includes, by weight: 60% to 75% nickel, 10.0% to 20.0% chromium, 5% to 15% molybdenum, 0.5% to 10% tantalum and niobium in total, 0.5% to 10% tungsten, 2.0% to 7.0% aluminum, 0.1% to 1.0% titanium, 0.1% to 2.0% iron, and a balance of unavoidable trace impurities, wherein the total content of the impurities is not greater than 0.5 wt %, and the oxygen content in the high-temperature corrosion-resistant alloy tube is less than 9 ppm.

In this example, the electrical conductivity of the composite wire monofilament under high-temperature operating conditions (e.g., at 800° C. to 1000° C.) is no less than 10%. In some embodiments, the electrical conductivity of the composite wire monofilament under high-temperature conditions may be one of 12%, 14%, 16%, 18%, or 20%.

Example 2

In this example, the highly conductive core wire 1 is pure copper.

In this example, the electrical conductivity of the composite wire monofilament under high-temperature operating conditions (e.g., at 800° C. to 1000° C.) is no less than 15%. In some embodiments, the electrical conductivity of the composite wire monofilament under high-temperature conditions may be one of 16%, 18%, 20%, 22%, or 24%.

All other aspects are the same as in Example 1.

Example 3

In this example, the highly conductive core wire 1 is a copper-silver alloy. In some embodiments, the copper-silver alloy includes, by weight: silver 6%.

In this example, the ratio of the cross-sectional area of the core wire 1 to the total cross-sectional area of the composite wire monofilament is 50%.

All other aspects are the same as in Example 1.

Example 4

In this example, the high-temperature corrosion-resistant alloy tube 2 includes, by weight: 60% to 75% nickel, 10.0% to 20.0% chromium, 6% to 10% molybdenum, 2% to 3% tantalum, 1.5% niobium, 4% to 5% tungsten, 2.0% to 7.0% aluminum, 0.1% to 1.0% titanium, 0.1% to 2.0% iron, and a balance of unavoidable trace impurities, wherein the total content of the impurities is not greater than 0.5 wt %, and the oxygen content in the high-temperature corrosion-resistant alloy tube is less than 9 ppm.

In this example, the highly conductive core wire 1 is a copper-silver alloy, wherein the silver content by weight is 6%.

In this example, the ratio of the cross-sectional area of the core wire 1 to the total cross-sectional area of the composite wire monofilament ranges from 40% to 50%.

In this example, the diameter of the composite wire monofilament is 0.1 mm.

All other aspects are the same as in Example 1.

Comparative Example 1

In this example, the high-temperature corrosion-resistant alloy tube 2 includes, by weight: 60% to 75% nickel, 10.0% to 20.0% chromium, 0.5% to 10% tantalum and niobium in total, 0.5% to 10% tungsten, 2.0% to 7.0% aluminum, 0.1% to 1.0% titanium, 0.1% to 2.0% iron, and a balance of unavoidable trace impurities, wherein the total content of the impurities is not greater than 0.5 wt %, and the oxygen content in the high-temperature corrosion-resistant alloy tube is less than 9 ppm.

In this example, the highly conductive core wire 1 is a copper-silver alloy, wherein the silver content by weight is 6%.

In this example, the ratio of the cross-sectional area of the core wire 1 to the total cross-sectional area of the composite wire monofilament is 50%.

In this example, the diameter of the composite wire monofilament is 0.16 mm.

All other aspects are the same as in Example 1.

Comparative Example 2

In this example, the high-temperature corrosion-resistant alloy tube 2 includes, by weight: 60% to 75% nickel, 10.0% to 20.0% chromium, 5% to 15% molybdenum, 0.5% to 10% tantalum and niobium in total, 2.0% to 7.0% aluminum, 0.1% to 1.0% titanium, 0.1% to 2.0% iron, and a balance of unavoidable trace impurities, wherein the total content of the impurities is not greater than 0.5 wt %, and the oxygen content in the high-temperature corrosion-resistant alloy tube is less than 9 ppm.

In this example, the highly conductive core wire 1 is a copper-silver alloy, wherein the silver content by weight is 6%.

In this example, the ratio of the cross-sectional area of the core wire 1 to the total cross-sectional area of the composite wire monofilament is 50%.

In this example, the diameter of the composite wire monofilament is 0.16 mm.

All other aspects are the same as in Example 1.

Comparative Example 3

Figure 6:
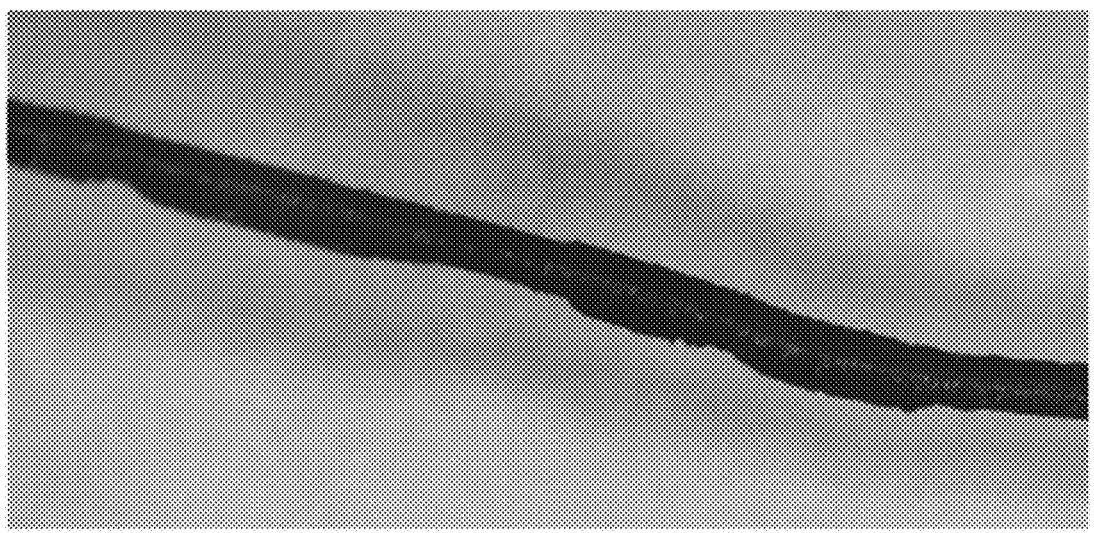
FIG. 6 is a schematic microscopic view of a surface of a composite wire monofilament after a short-term operation under an operating condition of 1000° C., according to Comparative Example 3 of the present disclosure.

A high-temperature, high-strength, high-conductivity stranded conductor was prepared using the technical solution described in Example 3 of CN118155913A. Under operating conditions above 800° C., the signal transmission performance of the stranded conductor in this comparative example failed after a very short period. As shown in FIG. 6, after a brief period of operation under an operating condition of 1000° C., a surface of the conductor is completely charred, indicating severe damage and rendering the conductor unusable.

Conventional testing techniques in the field were used to evaluate the tensile strength and endurance properties of the stranded conductors from Examples 1~4 and Comparative Examples 1-3. The results are presented in Tables 1 and 2 below.

TABLE 1

Tensile Performance Test

| No. | Test Temperature (° C.) | Tensile Strength (MPa) |
|---|---|---|
| Example 1 | 800 | ≥150 |
|  | 900 | ≥80 |
|  | 1000 | ≥50 |
| Example 2 | 800 | ≥150 |
|  | 900 | ≥80 |
|  | 1000 | ≥50 |
| Example 3 | 800 | ≥400 |
|  | 900 | ≥100 |
|  | 1000 | ≥80 |
| Example 4 | 800 | ≥420 |
|  | 900 | ≥150 |
|  | 1000 | ≥100 |
| Comparative Example 1 | 800 | ≥135 |
|  | 900 | ≥70 |
|  | 1000 | ≥35 |
| Comparative Example 2 | 800 | ≥100 |
|  | 900 | ≥55 |
|  | 1000 | ≥25 |

TABLE 2

Endurance Life Test

| No. | Test Conditions | Endurance Life (h) |
|---|---|---|
| Example 1 | 900° C. and 150 MPa | ≥10000 |
|  | 1000° C. and 100 MPa | ≥2000 |
| Example 2 | 900° C. and 150 MPa | ≥10000 |
|  | 1000° C. and 100 MPa | ≥2000 |
| Example 3 | 900° C. and 150 MPa | ≥18000 |
|  | 1000° C. and 100 MPa | ≥3000 |
| Example 4 | 900° C. and 150 MPa | ≥20000 |
|  | 1000° C. and 100 MPa | ≥3500 |
| Comparative Example 1 | 900° C. and 150 MPa | ≥6000 |
|  | 1000° C. and 100 MPa | ≥1100 |
| Comparative Example 2 | 900° C. and 150 MPa | ≥7300 |
|  | 1000° C. and 100 MPa | ≥1600 |
| Comparative Example 3 | Referring to Table 1 above, the stranded conductor could not be tested under the specified conditions. | |

Figure 3:
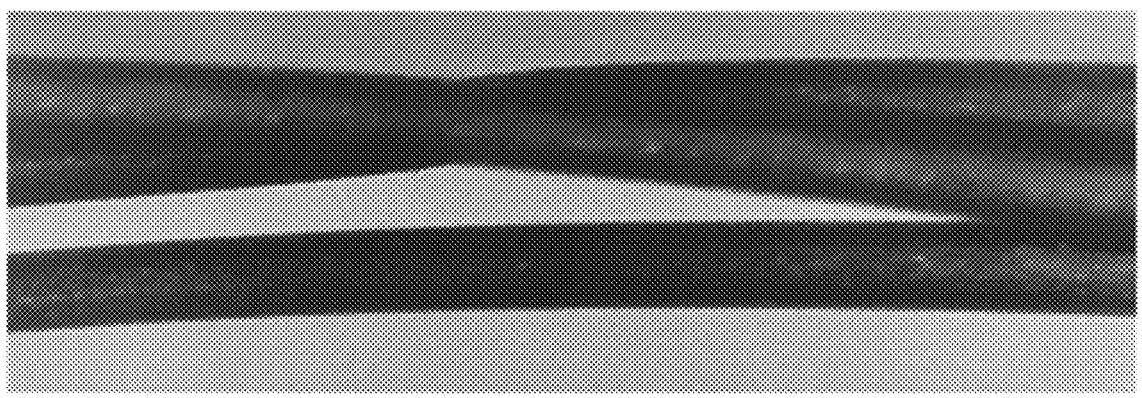
FIG. 3 is a schematic microscopic view of a surface of a composite wire monofilament after a prolonged operation under an operating condition of 1000° C., according to Example 1 of the present disclosure.
Figure 4:
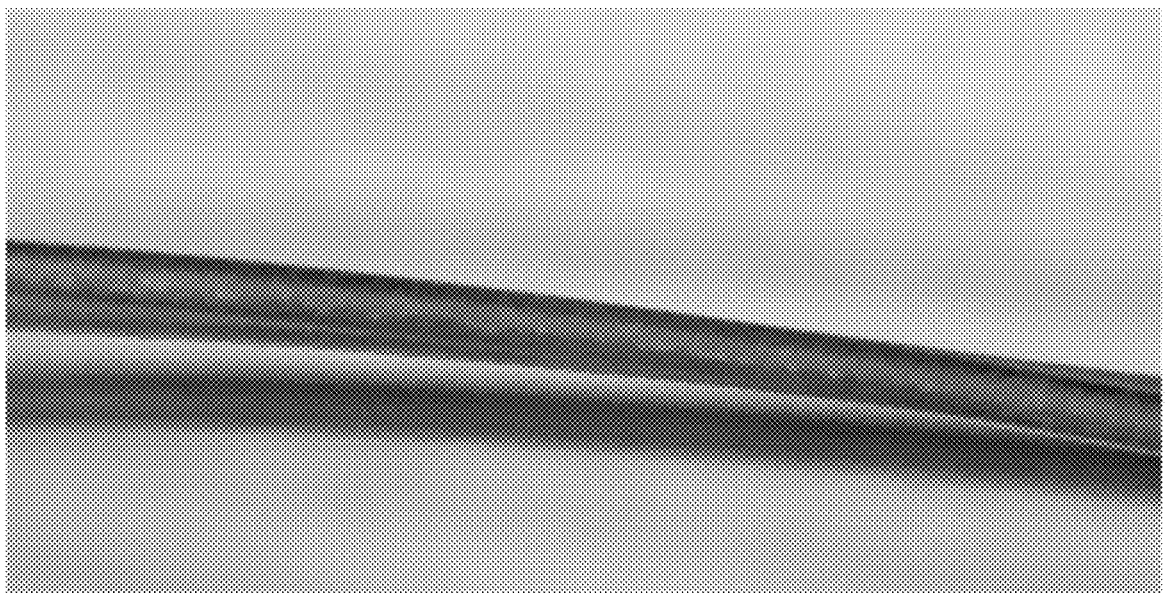
FIG. 4 is a schematic microscopic view of a surface of a composite wire monofilament after a prolonged operation under an operating condition of 1000° C., according to Example 2 of the present disclosure.

Since molybdenum enhances the high-temperature oxidation resistance of the alloy and tungsten effectively suppresses void formation during creep under high-temperature conditions, FIGS. 3 to 4, combined with Tables 1 and 2 above, demonstrate that the composite wire monofilaments in Examples 1 to 4 of the present disclosure maintain excellent surface quality after prolonged operation under the operating condition of 1000° C. As seen in FIGS. 3 and 4, the conductor surface remains intact, exhibiting superior high-temperature corrosion resistance. The conductor functions normally without signal interruption, and both the tensile strength and the electrical conductivity meet operational requirements under the operating condition of 1000° C.

Figure 5:
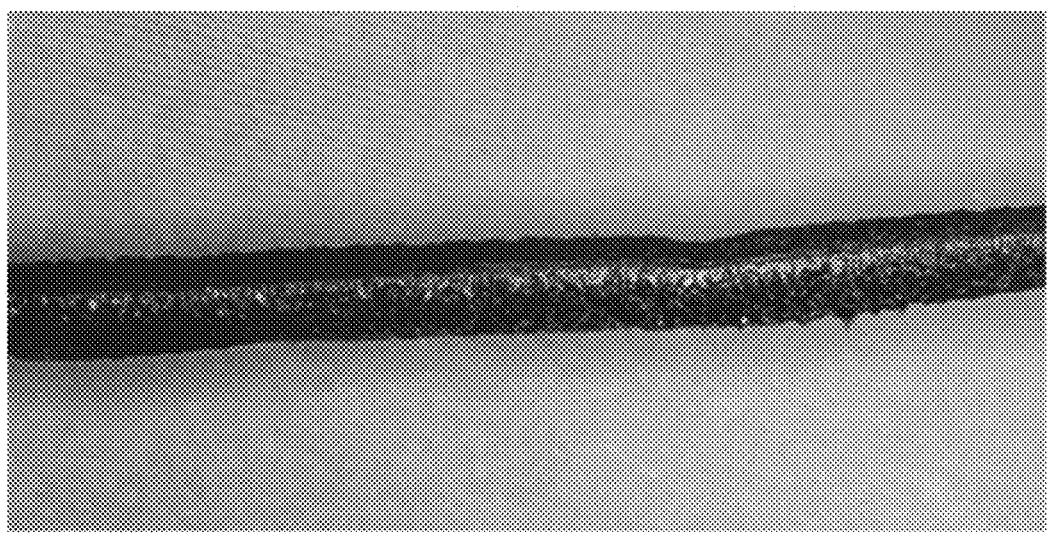
FIG. 5 is a schematic microscopic view of a surface of a composite wire monofilament after a prolonged operation under an operating condition of 1000° C., according to Comparative Example 1 of the present disclosure.

Referring to FIG. 5 and Tables 1 and 2, it may be observed that after prolonged operation under the temperature condition of 1000° C., the surface morphology of the composite wire monofilament in Comparative Example 1 exhibits regular and mild oxidative damage. Under the same test conditions, the surface morphology of the composite wire monofilament in Comparative Example 2 is similar to that shown in FIG. 5, and the endurance life of the composite wire monofilaments in Comparative Examples 1 and 2 is significantly shorter than the endurance life of the composite wire monofilaments in Examples 1 to 4.

As shown in FIG. 6, in conjunction with Tables 1 and 2, it may be observed that after a short period of operation under the operating condition of 1000° C., the composite wire monofilament in Comparative Example 3 exhibits partial surface damage, rendering it unable to function properly.

Furthermore, the composite wire monofilaments in Examples 1 to 4 of the present disclosure exhibit a comprehensive tensile strength of no less than 300 MPa under high-temperature operating conditions of 600° C. to 750° C.

In summary, the stranded conductor provided by the embodiments of the present disclosure offers space and weight savings while maintaining high conductivity, corrosion resistance, and relatively stable signal transmission performance, particularly in high-temperature operating conditions of 800° C. to 1000° C.

The above descriptions are merely preferred embodiments of the present disclosure and are not intended to limit the scope of the present disclosure. Any modifications, equivalent substitutions, or improvements made within the spirit and principles of the present disclosure shall be included within the protection scope of the present disclosure.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, numbers describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of +20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A high-temperature corrosion-resistant stranded conductor, comprising:
  a plurality of composite wire monofilaments twisted together, each of the plurality of composite wire monofilaments being formed by a highly conductive core wire and a high-temperature corrosion-resistant alloy cladding the core wire, such that the stranded conductor is capable of maintaining strength and transmitting a signal under a high-temperature atmospheric environment below 1000° C. for an extended period of time, wherein
  the highly conductive core wire is made of copper or a copper alloy;
  the high-temperature corrosion-resistant alloy includes, by weight: 60% to 75% nickel, 10.0% to 20.0% chromium, 5% to 15% molybdenum, 0.5% to 10% tantalum and niobium in total, 0.5% to 10% tungsten, 2.0% to 7.0% aluminum, 0.1% to 1.0% titanium, 0.1% to 2.0% iron, and a balance of unavoidable trace impurities, wherein a total content of the impurities is not greater than 0.5 wt %, and an oxygen content in the high-temperature corrosion-resistant alloy is less than 9 ppm.

2. The high-temperature corrosion-resistant stranded conductor of claim 1, wherein
the high-temperature corrosion-resistant alloy includes, by weight: 60% to 75% nickel, 10.0% to 20.0% chromium, 6% to 10% molybdenum, 2% to 3% tantalum, 1.5% niobium, 4% to 5% tungsten, 2.0% to 7.0% aluminum, 0.1% to 1.0% titanium, 0.1% to 2.0% iron, and a balance of unavoidable trace impurities, wherein the total content of the impurities is not greater than 0.5 wt %, and the oxygen content in the high-temperature corrosion-resistant alloy is less than 9 ppm.

3. The high-temperature corrosion-resistant stranded conductor of claim 1, wherein
a ratio of a cross-sectional area of the highly conductive core wire in the composite wire monofilament to a total cross-sectional area of the composite wire monofilament ranges from 20% to 50%.

4. The high-temperature corrosion-resistant stranded conductor of claim 1, wherein
a diameter of the composite wire monofilament ranges from 0.08 mm to 0.5 mm.

5. The high-temperature corrosion-resistant stranded conductor of claim 1, wherein
under an operating condition of 20° C., a tensile strength of the composite wire monofilament is greater than 400 MPa, an electrical conductivity of the composite wire monofilament is greater than 20%, and an elongation rate of the composite wire monofilament is greater than 2%.

6. The high-temperature corrosion-resistant stranded conductor of claim 1, wherein
the composite wire monofilament maintains the following tensile strengths under high-temperature operating conditions:
a tensile strength not less than 50 MPa under an operating condition of 1000° C.,
a tensile strength not less than 80 MPa under an operating condition of 900° C.,
a tensile strength not less than 150 MPa under an operating condition of 800° C., and
a tensile strength not less than 300 MPa under operating conditions of 600° C. to 750° C.

7. The high-temperature corrosion-resistant stranded conductor of claim 1, wherein
the copper alloy is a copper-silver alloy, and the copper-silver alloy includes, by weight: 1% to 6% silver, and a balance of copper and unavoidable impurities, wherein a total content of the impurities is not greater than 0.05 wt %, and an oxygen content in the copper-silver alloy is less than 9 ppm;
after annealing, a tensile strength of the highly conductive core wire is not less than 300 MPa, and an electrical conductivity of the highly conductive core wire is greater than 80%; and
an electrical conductivity of the composite wire monofilament is not less than 10% under operating conditions of 600° C. to 1000° C.

8. The high-temperature corrosion-resistant stranded conductor of claim 1, wherein
the highly conductive core wire is made of copper, and an electrical conductivity of the composite wire monofilament is not less than 15% under operating conditions of 600° C. to 1000° C.

* * * * *